March 23, 1926. 1,578,173

V. RETTERATH

PLUG FOR UNITING STRUCTURAL AND MACHINE PARTS

Filed July 8, 1925

Inventor:
Valentin Retterath
By Chas. N. Keel
Atty

Patented Mar. 23, 1926.

1,578,173

UNITED STATES PATENT OFFICE.

VALENTIN RETTERATH, OF INGOLSTADT, GERMANY.

PLUG FOR UNITING STRUCTURAL AND MACHINE PARTS.

Application filed July 8, 1925. Serial No. 42,328.

*To all whom it may concern:*

Be it known that I, VALENTIN RETTERATH, a citizen of the German Republic, residing at Ingolstadt, county of Bavaria, Germany, have invented a certain new and useful Plug for Uniting Structural and Machine Parts, of which the following is a specification.

For connecting or securing together machine elements, structural parts or the like, it has been the practice to use conical or cylindrical plugs, which are fitted into holes drilled into the parts to be connected. By this method, a satisfactory connection or securing of parts is obtained only where there is accurate fitting between the pin and hole and this requires careful and precise workmanship, both in the making of the plug and in drilling, reaming, etc., of the holes into which the plug is to be placed.

The object of the present invention is to provide a fastening means which obviates the necessity for such cumbersome and laborious methods of finishing and fitting the securing means; and permits the proper and effective connections to be made, by use of a pin which need not present carefully finished surfaces, and which can be used in drilled holes without reaming or other finishing methods. The result is obtained by using metal plugs provided with beveled or flattened faces, grooves or the like, which are of increasing depth toward one end of the plug, and which bevels or grooves enable the plug to be reduced in diameter when pressed or driven into a hole.

In general, the plug is conical or frusto-conical in shape; and with the sides somewhat bulged, a special advantage is obtained in that such shape tends to avoid the forming of a sharp arris at the edge of the bore when the plug is pressed into its securing or holding position. This bulging contour also facilitates the conforming of the plug to the wall of the bore.

This invention consists further in the use of plugs of the kind described for joining machine parts and structural elements generally.

Also it is a further object of the present invention to provide an improved fastening between the elements of a machine or mechanical structure, using plugs of the herein-described new construction, the method of fastening consisting in drilling cylindrical or conical bores into the elements or parts to be united, and to drive into such bores the plugs which are of conical or frusto-conical shape (and may further have the bulging contour along the length of the plug) and which are provided with bevels or grooves, above described, with the result that part of the material of the plug is translodged or shifted, so that the grooves or beveled faces are reduced in size and the plug tends to resume the shape it had before being provided with the grooves or beveled faces.

The present application is a continuation in part of my copending application Serial No. 692,845, filed February 4, 1924.

In the drawings, the invention is illustrated by way of example, wherein—

Figure 1:
Figures 1 and 2 are views in elevation and plan, respectively, of a conical or frusto-conical and somewhat bulged plug which is beveled or flattened at two sides.
Figure 2:
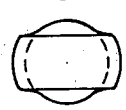
Figure 5:
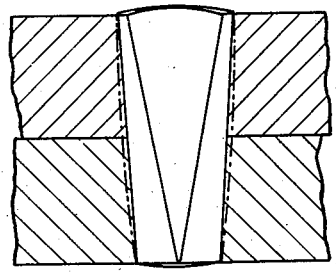
Fig. 5 is a sectional view showing the application of the plug of Figs. 1 and 2 as a connecting means between two elements of a structure to be united or connected by a plug in accordance with this invention.

In the embodiment of the invention shown in Figure 5, a frusto-conical plug is used which is illustrated in Figs. 1 and 2, and which plug is provided with the bulged sides. By pressing or forcing the plug into the bores of the two parts of the structure to be connected, the diameter of the plug has been reduced and a part of the material of the plug has been shifted back toward its original position before the beveled faces had been formed thereon.

Figure 3:
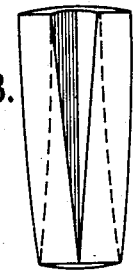
Figs. 3 and 4 are illustrations of a similar plug which is provided with longitudinal grooves.
Figure 4:
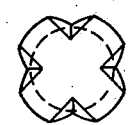

In order to secure as much contact-giving surface as is possible and to thereby effect a firm fastening and sticking of the plugs, it is advisable to use plugs having longitudinal notches or grooves as shown in Figs. 3 and 4. These notches or grooves extend longitudinally of the plug and are of increasing depth from a point adjacent the small end thereof to the larger end, the bottoms of these grooves converging toward the axis of the plug at the larger end thereof. In the particular embodiment illustrated in Figs. 3 and 4 there are four of these longitudinal notches or grooves which are equally spaced laterally about the periphery thereof.

The plugs illustrated in Figs. 1 to 4 are frusto-conical and at the same time have the bulging contour, which shape may be obtained by a translodging of the material in plugs of circular cross section. The plug shown in Figs. 1 and 2, for example, may be obtained by subjecting a cylindrical plug of circular cross-section to pressure between dies which have convex or outwardly bulged die surfaces. The grooved plug illustrated in Figs. 3 and 4 is formed by pressing a cylindrical plug between dies having correspondingly curved or bulging die surfaces.

Figure 6:
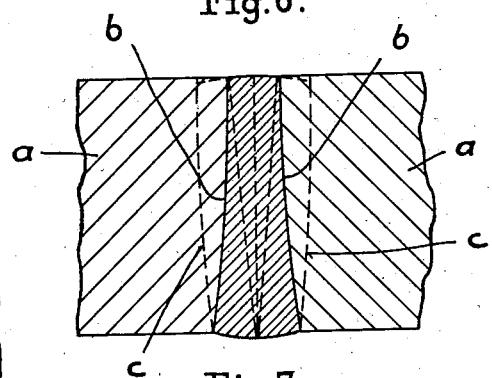
Figs. 6 and 7 are a section and plan view of a device for manufacturing plugs having bulged sides and longitudinal grooves.
Figure 7:
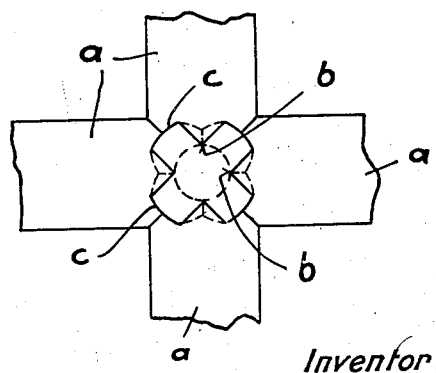

A device for manufacturing plugs of the last mentioned type is illustrated in Figs. 6 and 7. *a* are the pressing stamps or dies which are radially arranged with regard to the cross-section of the plug, and the dies have curved pressing edges *b*, which are inclined along the axis of the plug as may be required by the shape of the plug to be formed. For this purpose, the pressing edges are arranged to advance nearer to the axis of the plug at the places or parts where the plug is to be given the greatest diameter, so that at these places the pressing or die edges will translodge the greatest amount of material. In order that the translodged material shall retain its circular section, the dies *a* are also provided with surfaces *c* which present to the plug, surfaces which are circular in transverse section and which correspond to the bulged conical shape to be produced in longitudinal section. These surfaces serve to limit the extent of translodging of material during the die pressing operation. The pressing dies or stamps *a* are adapted to press simultaneously from the different angles on the centrally arranged cylindrical plug, the apparatus for effecting this being omitted for convenience in illustration. The translodging of the material in plugs which are longitudinally cylindrical may be also accomplished by other suitable tools such as cylindrical rollers or wheels which have a profile corresponding to the grooves to be pressed into the plugs, and which tools are moved along the plug in such a way that they translodge the material in accordance with a predetermined size of the finished plug to be produced.

As an illustration of the many uses to which this invention may be applied, it is sufficient to point out by way of example that it may be used to connect together two disks or gears which are supported upon and are to be driven from a common shaft; or the tapered pin may constitute the end of a small shaft for securing a disk wheel thereon.

I claim:

1. A metallic securing pin of tapered form having a plurality of narrow longitudinal laterally spaced grooves about its periphery, the bottoms of said grooves gradually converging toward the axis of the pin at the larger end thereof.

2. A metallic securing pin of tapered form the sides of which have a bulging contour, and a plurality of longitudinal grooves extending along the sides and spaced laterally about the periphery of the pin, the bottoms of said grooves gradually converging toward the axis of the pin at the larger end thereof.

3. A securing means for joining machine elements and structural parts, consisting of a metallic pin of substantially frusto-conical shape to be pressed into a hole and retained therein by frictional contact between the surfaces of the pin and the surrounding walls of the hole, the said pin being formed with one or more longitudinal grooves on its outer surface of increasing depth toward the larger end of the pin, to permit translodging of a part of the metal of the pin when pressed into the hole in the securing position.

4. A securing means for joining machine elements and structural parts, consisting of a metallic pin of substantially frusto-conical shape to be pressed into a hole and retained therein by frictional contact betweeen the surfaces of the pin and the surrounding walls of the hole, the said pin having its outer surface divided into segmental areas to form frictional contacting surfaces of progressively increasing diameter toward the larger end of the pin, separated by longitudinally arranged surface portions of less distance from the center at any cross-section to receive the translodged metal from the said area when the pin is pressed into the hole in the securing position.

In testimony whereof I affix my signature.

VALENTIN RETTERATH.